US008750906B2

(12) United States Patent
Winkler et al.

(10) Patent No.: US 8,750,906 B2
(45) Date of Patent: Jun. 10, 2014

(54) DYNAMIC ELEMENTS ON A MAP WITHIN A MOBILE DEVICE, SUCH AS ELEMENTS THAT FACILITATE COMMUNICATION BETWEEN USERS

(75) Inventors: David Winkler, Seattle, WA (US); Randy Meyerson, Seattle, WA (US); Edward Carrigan, Edmonds, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 1066 days.

(21) Appl. No.: 12/390,367

(22) Filed: Feb. 20, 2009

(65) Prior Publication Data

US 2010/0216491 A1    Aug. 26, 2010

(51) Int. Cl.
*H04W 24/00*    (2009.01)

(52) U.S. Cl.
USPC ............ 455/457; 455/456.1; 455/456.2; 455/456.3; 455/456.5; 455/456.6; 455/404.2; 455/414.1; 455/418; 455/419; 455/420; 340/988; 340/995.1; 340/995.12; 701/200; 701/201; 701/211; 701/212

(58) Field of Classification Search
USPC ............ 455/404.1, 404.2, 414.1, 414.2, 455/418–420, 456.1–457, 466, 518, 519, 455/550.1, 556.1, 556.2, 566; 701/200, 701/201, 211, 212; 340/988–990, 995.1, 340/995.11, 995.12, 995.14, 995.15
See application file for complete search history.

(56) References Cited

U.S. PATENT DOCUMENTS

| | | | |
|---|---|---|---|
| 5,432,542 A | 7/1995 | Thibadeau et al. | |
| 5,740,538 A | 4/1998 | Joyce et al. | |
| 6,295,528 B1 | 9/2001 | Marcus et al. | |
| 6,377,793 B1 | 4/2002 | Jenkins | |
| 6,400,956 B1 | 6/2002 | Richton | |
| 6,480,713 B2 | 11/2002 | Jenkins | |
| 6,647,257 B2 | 11/2003 | Owensby | |
| 6,681,107 B2 | 1/2004 | Jenkins et al. | |
| 6,720,956 B1 | 4/2004 | Honma et al. | |
| 6,741,835 B2 | 5/2004 | Pulver | |
| 6,836,730 B2 | 12/2004 | Root et al. | |
| 6,845,324 B2 | 1/2005 | Smith | |
| 6,868,410 B2 | 3/2005 | Fortin et al. | |
| 6,973,386 B2 * | 12/2005 | Gibbs | 340/995.14 |
| 7,116,985 B2 | 10/2006 | Wilson et al. | |
| 7,167,910 B2 * | 1/2007 | Farnham et al. | 709/223 |
| 7,363,024 B2 | 4/2008 | Jenkins | |
| 7,743,337 B1 * | 6/2010 | Maeda et al. | 715/781 |
| 7,822,539 B2 * | 10/2010 | Akiyoshi et al. | 701/201 |
| 7,853,273 B2 * | 12/2010 | Beyer, Jr. | 455/457 |
| 8,000,726 B2 * | 8/2011 | Altman et al. | 455/456.3 |
| 2002/0067308 A1 | 6/2002 | Robertson | |
| 2003/0004743 A1 | 1/2003 | Callegari | |
| 2003/0107490 A1 | 6/2003 | Sznaider et al. | |
| 2003/0202104 A1 | 10/2003 | Werner | |

(Continued)

OTHER PUBLICATIONS

US 2006/0276138 A1, 12/2006, Pummill et al. (withdrawn).

(Continued)

*Primary Examiner* — Olumide T Ajibade Akonai

(57) ABSTRACT

A system and method for providing information on a map displayed by a mobile device is described. In some examples, the system facilitates user control of map elements, such as dynamically changing map elements based on events that occur at a user's mobile device or at locations associated with the map elements. In some examples, the system enables communication between users via map elements.

30 Claims, 9 Drawing Sheets

(56) References Cited

U.S. PATENT DOCUMENTS

| | | | |
|---|---|---|---|
| 2004/0076279 A1 | 4/2004 | Taschereau | |
| 2004/0108375 A1 | 6/2004 | Maillard | |
| 2004/0192299 A1 | 9/2004 | Wilson et al. | |
| 2004/0264461 A1 | 12/2004 | Janneteau et al. | |
| 2005/0131639 A1 | 6/2005 | Broussard et al. | |
| 2005/0227711 A1 | 10/2005 | Orwant et al. | |
| 2005/0261012 A1 | 11/2005 | Weiser | |
| 2006/0089160 A1 | 4/2006 | Othmer | |
| 2006/0270421 A1 | 11/2006 | Phillips et al. | |
| 2007/0069923 A1* | 3/2007 | Mendelson | 340/988 |
| 2007/0073717 A1 | 3/2007 | Ramer et al. | |
| 2007/0270163 A1 | 11/2007 | Anupam et al. | |
| 2008/0113614 A1 | 5/2008 | Rosenblatt | |
| 2008/0167004 A1 | 7/2008 | Jenkins | |
| 2009/0005981 A1* | 1/2009 | Forstall et al. | 701/211 |
| 2009/0024315 A1* | 1/2009 | Scheibe | 701/208 |
| 2009/0112467 A1* | 4/2009 | Jiang et al. | 701/211 |
| 2009/0160859 A1* | 6/2009 | Horowitz et al. | 345/440 |
| 2009/0191840 A1 | 7/2009 | Piett et al. | |
| 2009/0291630 A1 | 11/2009 | Dunn et al. | |
| 2010/0023895 A1 | 1/2010 | Benko et al. | |
| 2010/0093373 A1 | 4/2010 | Olsson et al. | |
| 2010/0182145 A1 | 7/2010 | Ungari | |
| 2010/0205242 A1* | 8/2010 | Marchioro et al. | 709/203 |
| 2010/0234046 A1 | 9/2010 | Wood | |

OTHER PUBLICATIONS

""WARN" Act Rules Released," Commercial Mobile Alert System: CommLaw Blog, Aug. 14, 2008, http://www.commlawblog.com/tags/commercial-mobile-alert-system/ [Last Accessed Apr. 27, 2010], 2 pages.

"Enkin Blog: Navigation reinvented," Max Braun & Rafael Spring, Dec. 7, 2009, http://enkinblog.blogspot.com/ [Last Accessed Apr. 27, 2010], 4 pages.

"Enkin on Vimeo," http://vimeo.com/843168 [Last Accessed Apr. 27, 2010], 5 pages.

"GeoRSS," Wikipedia, http://en.wikipedia.org/wiki/GeoRSS, May 19, 2009 [Last Accessed Apr. 26, 2010], 4 pages.

"GeoRSS: Geographically Encoded Objects for RSS feeds," http://georss.org [Last Accessed Apr. 26, 2010], 2 pages.

"Googe Maps Help Center," Google Maps, http://maps.google.com/support/bin/answer.py?hl=en&answer=68480 [Accessed Apr. 26, 2010], 8 pages.

"Lan-based uma network controller with proxy connection," FreshPatents.com, Dec. 17, 2006, http://www.freshpatents.com/Lan-based-uma-network-controller-with-proxy-connection-dt20061207ptan20060276138.php [Accessed Apr. 27, 2010], 4 pages.

"What is Slam?", SLAM, http://www.msslam.com/About.aspx [Last Accessed Apr. 26, 2010], 4 pages.

Bourke, Paul, "Determining If a Point Lies on the Interior of a Polygon," Nov. 1987, http://local.wasp.uwa.edu.au/~pbourke/geometry/insidepoly/ [Last Accessed Apr. 27, 2010], 6 pages.

Charles, Dan, "GPS is Smartening Up Your Cell Phone," NPR, May 20, 2008, http://www.npr.org/templates/story/story.php?storyId=6097216 [Last Accessed Apr. 27, 2010], 4 pages.

International Search Report and Written Opinion, International Application No. PCT/US2009/037450, Filed on Mar. 17, 2009, Applicant: T-Mobile, USA, Inc., Date of Mailing: May 14, 2009, 10 pages.

Jaffe, Alexander et al., "Generating Summaries and Visualization for Large Collections of Geo-Referenced Photographs," MIR '06, Oct. 26-27, 2006, Santa Barbara, California, USA, 10 pages.

Mologogo, http://www.mologogo.com [Last Accessed Apr. 26, 2010], 3 pages.

Reardon, Marguerite, "Verizon Wireless adds friend-finding service," CNET Reviews, Mar. 28, 2008, http://reviews.cnet.com/8300-12261_7-51.html?keyword=GPS [Last Accessed May 20, 2008], 1 page.

"Global Imagination—Creators of the Dynamic and Interactive Planet Video Globe," Copyright 2008, http://www.globeimagination.com/index.html [Last Accessed Jun. 3, 2010], 2 pages.

"Interactive Talking Globe, Gray Base," National Geographic Society, Copyright 2009, 5 pages.

"Video: Microsoft's Sphere display in action," Seattle pi Blogs, http://blog.seattlepi.com/microsoft/archives/144629.asp [Last Accessed Jun. 3, 2010], 10 pages.

"Whrrl—Are You In? Check In to Join Societies," http://whrrl.com/home [Last Accessed Jun. 3, 2010], 1 page.

Honan, Mathew, "I Am Here: One Man's Experience With the Location-Aware Lifestyle," Wired Magazine, Jan. 19, 2009, 5 pages.

* cited by examiner

DYNAMIC ELEMENTS ON A MAP WITHIN A MOBILE DEVICE, SUCH AS ELEMENTS THAT FACILITATE COMMUNICATION BETWEEN USERS

BACKGROUND

Electronic and online mapping systems and applications, such as Mapquest, Google Maps, and others, enable users to embed information within a displayed map. For example, a user locates, or tags, an area on a map, and enters commentary, photographs, and other content to the tag.

Although mobile devices facilitate communication in a number of different ways (for example, users can send email messages, make telephone calls, send text and multimedia messages, chat with other users, and so on), they also provide additional services, such as electronic maps. Some mobile devices also provide location-based services that utilize maps to display tags identifying locations of interest (e.g., restaurants, cafes, etc.) within a mobile device user's vicinity, or place a tag on a map to identify the location of the mobile device user's intended destination. In addition, some mobile devices can provide location based services identifying the locations of a user's friends or family. However, there may be times when the user wishes to leverage a device's capabilities in order to provide other functions. Current mobile devices may not provide such functionalities.

The need exists for a method and system that overcomes these problems and progresses the state of the art, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

Figure 1:
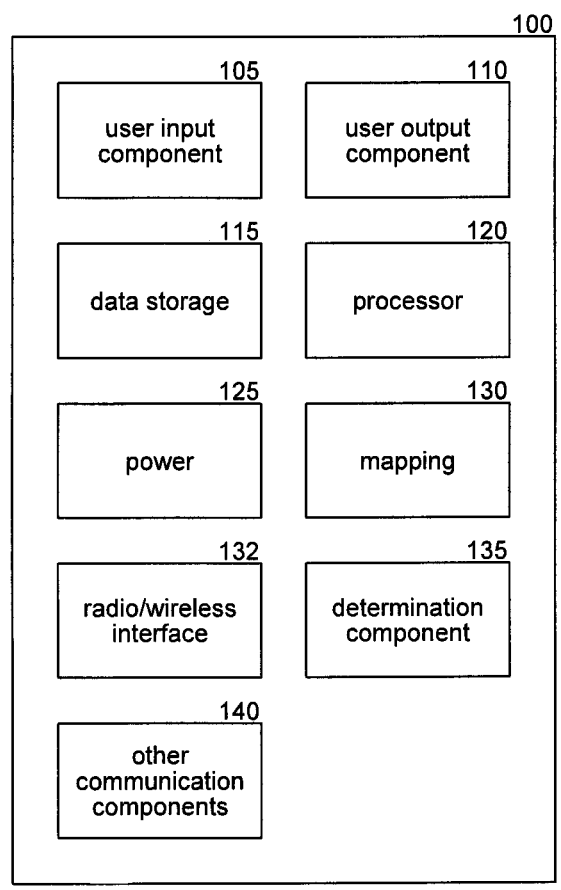
FIG. 1 is a block diagram illustrating a mobile device that provides dynamic elements and user-controlled elements on a map displayed by a mobile device.

The headings provided herein are for convenience only and do not necessarily affect the scope or meaning of the claimed system.

DETAILED DESCRIPTION

A system and method for generating and displaying graphical elements on a map, such as a map displayed by a mobile device, is described. The system includes two or more mobile devices and a server that stores information associated with the mobile devices. For example, the server may store location information for the mobile devices, information about locations on a map, and so on.

In some examples, the system facilitates communication between users of two or more mobile devices via map elements. For example, a map element, such as a tag displaying the location of one of the users, acts as an interface to launch a communication session between or among two or more users, thereby enabling the users to, for example, input messages and other displayable content. A user may initiate a communication session with a group of users via the map element, or may initiate a two-way communication session with one other user via the map element.

In some examples, the system updates, modifies, alters and/or changes displayed elements based on events that occur at or proximate to a user's mobile device, other users' mobile devices, or at a location associated with the element. For example, the system may modify the appearance of an element (such as change the color) when a certain number of mobile device users comment on a location, thereby indicating the location is popular. As another example, the system may modify the appearance of the element when a certain number of users (or their mobile devices) are located proximate to an associated location. In some cases, these elements may represent the mobile device user's friends, family members, contacts or members of a group associated with the mobile device user. The system may dynamically update the display (and/or appearance of the display) based on a number of factors, such as geographical movement of friends, family members, contacts or group members into and out of a displayed region on a map.

In some examples, the system presents or overlays a map or a displayed view of the map with various types of information based on the elements within the map. For example, the system may display one color on a section of a map having few placed elements, and different color on a section of the map having a large number of placed elements. As another example, the system may automatically alter the view of a map (such as zoom into the map) based on the number of elements placed on the map at a location, among other things.

Thus, in some examples a mobile device user may not only want to identify the location of his or her friends, family members or business associates, but may additionally want to initiate a communication session with a user directly from a map displaying the location of the other user. Further, a mobile device user may want to identify concentrations of other users at one or more locations.

Various examples of the system will now be described. The following description provides specific details for a thorough understanding and enabling description of these examples. One skilled in the relevant art will understand, however, that the system may be practiced without many of these details. Likewise, one skilled in the relevant art will also understand that the system incorporates many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the system. Indeed, certain terms may even be emphasized below; however, any terminology intended to be interpreted in any restricted manner will be overtly and specifically defined as such in this Detailed Description section.

Suitable System

As discussed herein, the system dynamically generates and displays map elements based on a number of factors. Referring to FIG. 1, a block diagram illustrating a mobile device 100 that provides dynamic elements and user-controlled elements on a map displayed by a mobile device is shown. The term "mobile device" may encompass any of a myriad of telecommunication devices such as cellular phones, VoIP phones, personal digital assistants, portable computers, mini computers, programmable consumer electronics, dumb terminals, media players, gaming devices and so on. Such mobile devices may include a central processing unit, memory, input devices (e.g., keypads and input buttons) and output devices (e.g., display devices). Mobile devices may also include hardware and operating instructions stored in memory for wirelessly transmitting and receiving data according to one or more wireless protocols. Such protocols include short range protocols (e.g., Bluetooth, Wi-Fi, Ultra-wideband, and ZigBee) and radio-access network protocols (e.g., GSM (Global System for Mobile Communications), CDMA (Code Division Multiple Access), UMTS (Universal Mobile Telecommunications System), EDGE (Enhanced Data for GSM Evolution), LTE (Long Term Evolution), Wimax (Worldwide Interoperability for Microwave Access), Voice Over Internet Protocol (VoIP), UMA/GAN (Unlicensed Mobile Access/Generic Access Network)).

The mobile device 100 may contain a power subsystem 125, data storage 115 to store programs and data, and at least one data processor 120 to run an operating system and applications to implement the mapping processes described herein. A user interfaces with the device via a user input component 105 (e.g., keypad, touchscreen, microphone, voice recognition system) and/or a user output component 110 (e.g., speaker, screen). The mobile device also includes a network interface 132 (such as a radio and/or wireless interface, an Enternet interface, a USB interface, and so on), and may include one or more communication components 140 to establish communication channels with a network and/or other devices. The communication component 140 may establish any number of suitable communication channels including Bluetooth, Wi-Fi, Ultra-wideband, ZigBee, GSM, GPRS, EDGE, UMTS, CDMA, and so on.

The mobile device 100 also contains a mapping component 130 that generates dynamically changing maps and elements on maps to be presented to a user via the user output component 110, and a location determination component 135, such as a global positioning system (GPS) component, RFID tag. In some examples, such as those involving devices that lack an integrated location determination component, location may be determined by one or more network-based technologies, such as A-GPS (Assisted GPS), TDOA (Time Difference of Arrival), triangulation, ATI, Secure User Plane Location (SUPL) or, for mobile devices operating on an IP-based wireless telecommunications network, methods and systems disclosed in WO/2007/121331, entitled "MOBILE COMPUTING DEVICE GEOGRAPHIC LOCATION DETERMINATION" and/or WO/2007/048028, entitled "SYSTEM AND METHOD FOR DETERMINING DEVICE LOCATION IN AN IP-BASED WIRELESS TELECOMMUNICATIONS NETWORK," which is incorporated by reference in its entirety.

In some examples, the mapping component 130 generates a number of different types of map elements. The following list provides a few examples, although many others not discussed are possible:

generic icons associated with all locations (such as pins, pointers, and so on), icons specific to a location or content, active icons, such as those that move when presented on a map, text balloons and similar text presentation and text entry elements, and so on.

Figure 2A:
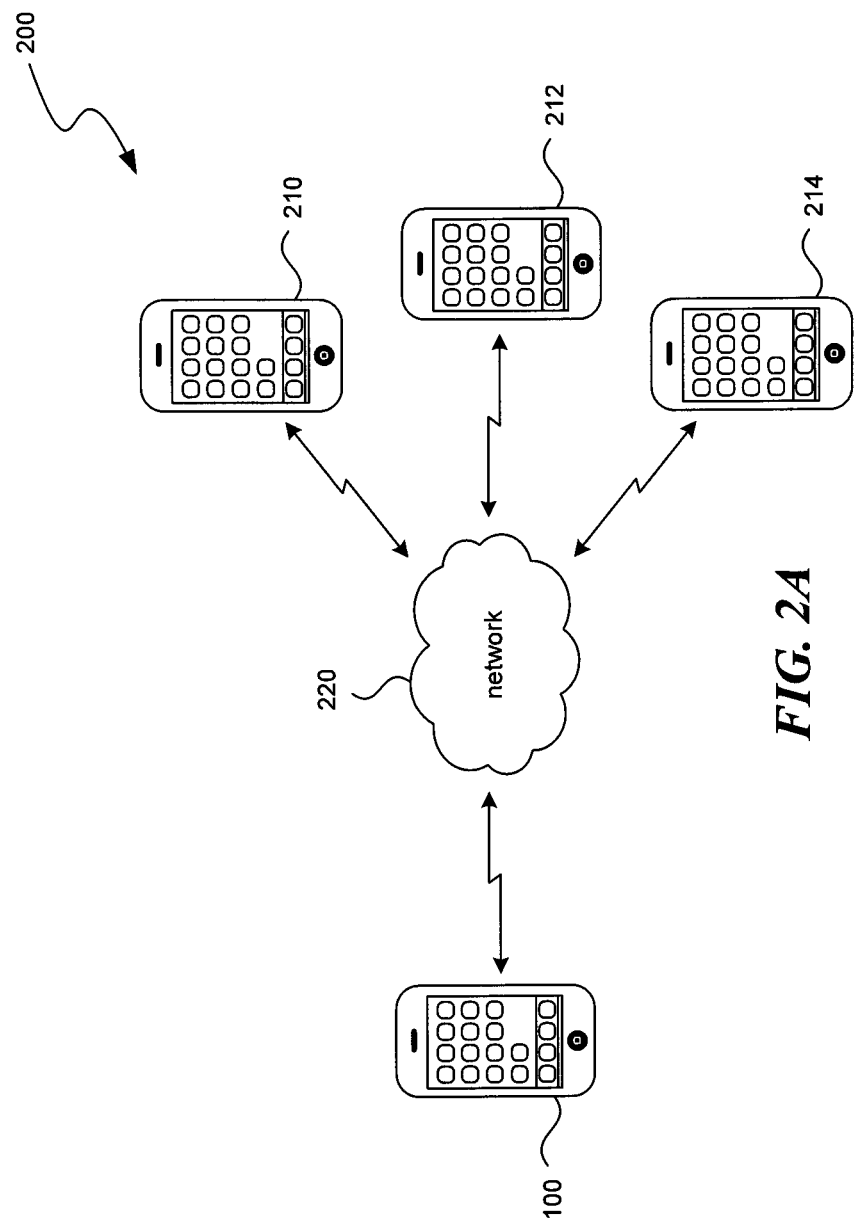
FIG. 2A is a block diagram illustrating a suitable system for providing dynamic elements and user-controlled elements on a map displayed by a mobile device.

Referring to FIG. 2A, a block diagram 200 illustrating a suitable system for providing dynamic elements and user-controlled elements on a map displayed by a mobile device is shown. Aspects of the system may be stored or distributed on tangible computer-readable media, including magnetically or optically readable computer discs, hard-wired or preprogrammed chips (e.g., EEPROM semiconductor chips), nano-technology memory, biological memory, or other data storage media. Alternatively or additionally, computer implemented instructions, data structures, screen displays, and other data under aspects of the system may be distributed over the Internet or over other networks (including cellular or IP-based telecommunications networks), on a propagated signal on a propagation medium (e.g., an electromagnetic wave(s), a sound wave, etc.) over a period of time, or they may be provided on any analog or digital network (packet switched, circuit switched, or other scheme).

The system 200 includes a mobile device 100 at a first location, two or more other mobile devices 210, 212, 214 (such as mobile devices from different manufacturers and associated with different service providers), and, in this example, network 220 that provides communication links between the mobile devices, stores information associated with the mobile devices, and sends and receives information from the mobile devices. Although only one network 220 is shown, it will be understood that mobile devices 210, 212 and 214 may access network 220 via one or more other telecommunications networks, including, for example, one or more cellular networks, IP-based telecommunications networks, the Internet, and peer-to-peer communications, as discussed herein.

Figure 2B:
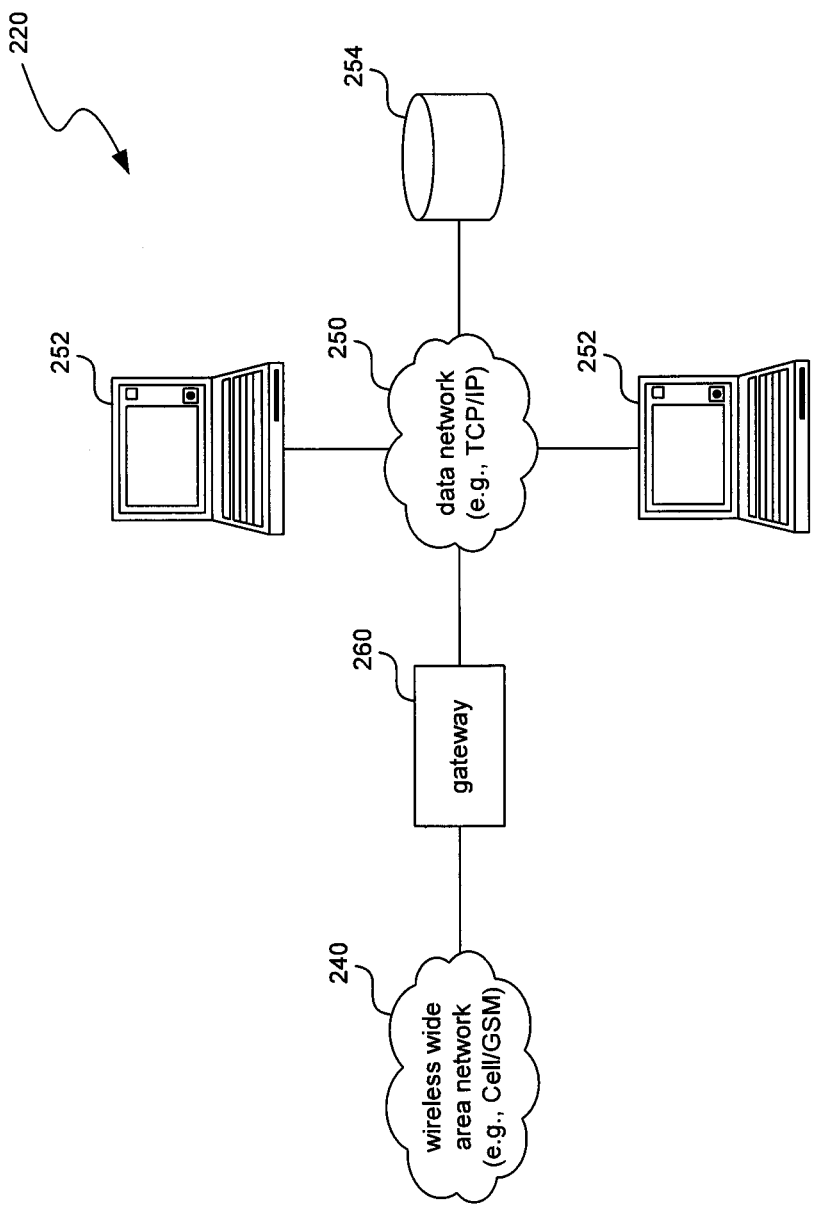
FIG. 2B is a block diagram illustrating suitable components within the network of FIG. 2A.

Referring to FIG. 2B, a block diagram illustrating suitable components within the network 220 is shown. The network 220 includes a data network 250 (e.g., TCP/IP or other protocol), which one or more telecommunications networks 240 may access via a gateway 260. The network 220 may include or communicate with one or more servers 252, a database 254, and so on. The servers 252 may display and/or present information to users of the mobile devices described herein, such as information stored in the database 254. They may include components similar to those shown in FIG. 1, including mapping components that generate map and map elements to be presented to users via mobile devices, communication components that enable communication of information between the servers 252 and mobile devices, and other components. Examples of presented information include: map information associated with a location of the mobile device, map information associated with the locations of other mobile devices, information related to elements presented on displayed maps, information, tables and data structures that store and associated content with various locations or events, and so on. Further details are discussed herein.

The servers 252 may also include or comprise one or more location determination components or devices that detect the location of mobile devices within the network 220. In some cases, these components may include or access points of interest (POI) databases for a street, neighborhood, or area represented by a map. A POI database includes entries that relate latitude and longitude information with content, and the location determination components may access information from these databases when generating map elements, identifying locations of mobile devices, and so on.

In some cases, these location determination components may be geoservers, which track a target area to identify locations of mobile devices within the target area. The geoserver may be a component of a network-based location system, such as A-GPS (Assisted GPS), TDOA (Time Difference of Arrival), triangulation, ATI, Secure User Plane Location (SUPL) or, for mobile devices operating on an IP-based wireless telecommunications network, methods and systems disclosed in the aforementioned applications, or may otherwise have access to one or more databases containing identification and location information for cell sites, access points and other network elements. For example, a database may be stored with CGI information for respective cells included in the defined shape representing the target area. Similarly, the database may store access point information for respective access points included in a defined shape representing a region having a greater concentration of posts or mobile devices. Thus, a geoserver implements a point-in-polygon search to determine identifiers (e.g., CGI, MAC addresses and other relevant broadcast identifiers) for mobile devices, base stations and access points that exist within the region. Further details regarding the functionality of geoservers and various systems and implementations that employ geoservers may be found in U.S. patent application Ser. No. 12/253,886, filed on Oct. 17, 2008, entitled GEOGRAPHIC TARGETING OF ALERTS, which is incorporated by reference in its entirety.

The network 220 may include or be part of any network capable of facilitating communications between devices, and is not limited to those shown in FIG. 2B. Examples include GSM (Global System for Mobile Communications), UMA/GAN (Unlicensed Mobile Access/Generic Access Network), CDMA (Code Division Multiple Access), UMTS (Universal Mobile Telecommunications System), EDGE (Enhanced Data for GSM Evolution), LTE (Long Term Evolution), Wimax (Worldwide Interoperability for Microwave Access), Voice Over Internet Protocol (VoIP), TCP/IP, and other technologies.

In some cases, the telecommunications networks 240 incorporate picocells, small base stations having short wireless ranges and generally located in residential or business locations to provide local coverage to that location. Picocells may be directly connected to a network, and often appear as cell sites having a Cell Global Identity (CGI) value within the network. In some cases, the telecommunications network(s) 240 (e.g., UMA networks) incorporate femtocell networks. Similar to VoIP, in femtocell networks voice communications are packetized and transmitted over the Internet. UMA networks typically feature WiFi access points for receiving and sending voice communications over an unlicensed spectrum; femtocell networks typically feature wireless access points broadcasting within licensed spectrums of a telecommunications service provider, with conversion of voice communications into IP packets for transmission over the Internet.

Thus the system may include a number of different devices on a wireless network. For example, the system may contain two or more mobile devices that include a map application configured to display maps via screens within the mobile devices, display map elements at locations on the displayed map, and modify the displayed elements based on received instructions. Also, the system may include a content server that includes a mapping component configured to provide instructions to mobile devices that present maps and map elements, a location determination component configured to identify a location of mobile devices within a network, a communication component configured to receive and send information to the mobile devices, and an event detection component configured to detect an occurrence of an event associated with the mobile devices and instruct the mapping component to provide instructions to the mobile devices based on the event.

Communication Between Users Via Elements on a Map

Figure 3:
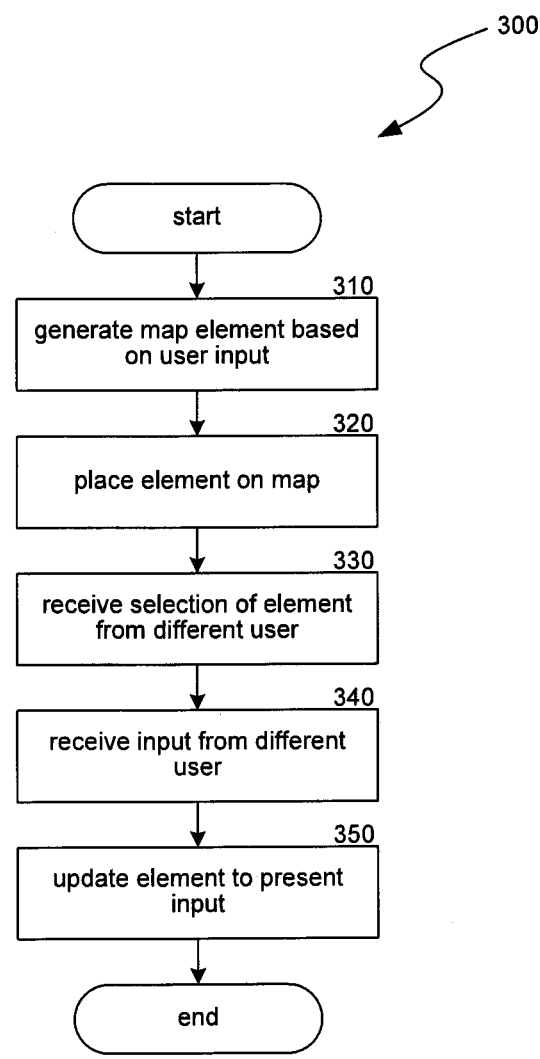
FIG. 3 is a flow diagram illustrating a routine for providing communication between users of mobile devices.

As discussed in some examples herein, the system facilitates communication between users of two or more mobile device via map elements. Referring to FIG. 3, a flow diagram illustrating a routine 300 for providing communication between users of mobile devices is shown. The mapping component 130, in combination with other components, may perform routine 300 or cause routine 300 to be performed.

In step 310, the system generates an element to be placed on a map based on input received from a user or from another source. As discussed herein, the generated element may be any number of graphical objects, and may be chosen based on the received input. For example, a first user may select a location of a coffee shop on a map, and the system may generate or supply a palette or pick list of icons, including a coffee mug icon, to be chosen as the graphical element. If the first user selects a location, the mobile device 100 may transmit a message or similar data to a server 252 within the network 220 identifying the location and content selected by the user. The system may also receive input from the user, such as commentary or remarks about the location, and generate a text element along with the graphical element, such as a text balloon or text box or other displayed text element. The system may display the text within a displayed balloon or box, may display a link to the text, and so on. Alternatively or additionally, the first mobile device user may manually and periodically update his or her location to the server 252, or may simply opt-in to allow the network 220 to automatically and periodically update (i.e., input) his or her present location, and the system will generate and/or update an element, as discussed herein. The first mobile device user may leave commentary associated with the element, which may be viewable by other users based on permissions granted by the first mobile device user when he or she, for example, registers to the system, coincidentally with leaving the commentary, or otherwise. The first mobile device user may also update the commentary and/or permissions associated with the commentary via his or her mobile device, by accessing a Website interface that permits Web-based updates, etc. The permissions may take a variety of forms, such as a permission for specific friends and family members to view the first user's elements, all contacts in the user's address book or network based address book, or all users of the system regardless of prior association. Further, the permissions may be limited to specific demographic profiles such as, for example, all users of the system within a specific age range.

In step 320, the system associates the element with a location on a map. For example, the system may tag a map with the element. The system may then display the element to the first mobile device user and/or to other mobile device users (e.g., all users, the mobile device user's contacts, or a selected number of users). The system, at server(s) 252, may receive the information about the map element from the mobile device 100 and update a data structure, such as a table, stored in database 254 and associated with a map displayed or presented to mobile devices 100, 210, 212, and/or 214 within the network 220. Table 1 depicts example entries included by the system:

TABLE 1

| Lat | Long | Element | UserID | Text | Time | Other |
|---|---|---|---|---|---|---|
| 47.62915 | −122.62939 | pindrop | 310260123456789 | "Cool place!" | 16:45 | ... |

Thus, the system, via a database 254 associated with a server 252 within the network 220, stores various data for maps and map elements presented by users associated with the network. Of course, the map and/or map data may be stored in other locations, such as on associated mobile devices, within other network components, and so on. In addition, the data may be stored in other forms, such as a hash map or other data structures.

As shown in the table, the data may include location information (latitude and longitude coordinates), an identifier for the map element, an ID for the first user's mobile device that received the input (shown as an IMSI, but may also be an MIN, IMEI, HNI, ESN, MAC address or other identifiers), any text input, a timestamp for the input, and other information. Other information may include information associated with the duration in which to maintain the element on the map, information that identifies other users that can modify the element, other network information, billing information, and so on.

In step 330, the system receives a selection of a placed element from a second user, such as a user of the mobile device 210. For example, the user may see an element on a map displayed on his/her mobile device 210 that is associated with a coffee shop location visited by the first user, may wish to both read the first user's commentary and engage in a communication session with the first user via the displayed element, and touch the element (assuming that the mobile device has a touch screen) to view the content and/or to initiate the communication session. The system may then display a text balloon that includes content about the location (such as contact information for the coffee shop), and/or content provided by the user of the mobile device 100 (such as a comment about the coffee shop). Once the element is chosen, the server 252 retrieves information from a table (such as Table 1), and displays the information to the user of mobile device 210. The system may additionally display communications options relating to the user's friend, as further disclosed herein.

In step 340, the second user may have the option of choosing among several types of communication session modes via-a-vis the first user. For instance, the second user may have opportunity to "call" the first user, to "e-mail" the first user, to "IM" (i.e., instant message) the first user, to send a "friend request" to the first user, to "reply" to the posted commentary, or other communication mode that is available to the second user. For example, if the second user wishes to "reply" to the commentary thread, he or she selects the "reply" option. The mobile device dispatches, and the system receives, such input from the second user. For example, the second user of a mobile device 210 may input an additional comment to the text balloon to be displayed along with the element.

In step 350, if the second user has "replied" to the first user's posted commentary, the system updates the element with the additional input. For example, the system may update the element to include both users' comments, and display both comments whenever the element is selected by other users. Upon receiving input, the mobile device 210 may transmit data to the server 252 to update the table with the additional comments. Further, the system may dispatch the second user's reply comment to the first user in an alternate communication format, such as an e-mail or SMS message alerting him or her that the second user has replied to his posting. Table 2 depicts an updated table:

TABLE 2

| Lat | Long | Element | UserID | Text | Time | Other |
|---|---|---|---|---|---|---|
| 47.62915 | −122.62939 | pindrop | 310260123456789 | "Cool place!" | 16:45 | ... |
| 47.62915 | −122.62939 | pindrop | 310260987654321 | "There soon" | 17:00 | ... |

It will be understood that selection of another communications options will launch a communication session in the selected communication mode. For example, selection of a "call" option may automatically cause the mobile device to directly dial and call the first user via a default or preferred telephone number stored in the second user's device or at a network location (such as a network address book or NAB as described herein). Alternatively, selection of a "call" option may cause the mobile device to automatically open a profile relating to the first user, with multiple calling options (e.g., a home phone number, an office phone number, and a mobile phone number) which, when one is selected, initiates dialing of a telephone call to the first user. Similarly, selection of an "e-mail", "SMS" or "IM" option causes the mobile device to launch an e-mail, text messaging or IM client enabling the second user to draft, finalize and dispatch a text-based message to the second user's default address (e.g, an e-mail address, SMS address, IM "handle", etc.) or to present the second user with multiple optional addresses. Similarly, the selection of a "Send Friend Request" option may initiate the transmission of an e-mail, SMS message or other message to the first user which, if accepted by the first user, may update the first user's permissions. The system therefore permits a user to initiate either a synchronous/real-time communication session (e.g., telephonic voice communication or text-based instant messaging session) or asynchronous communication session (e.g., e-mail, SMS, etc).

Thus, the system provides for communication and/or presentation of information between users via elements on a map. The system may restrict such communications to a finite group of users, such as users within a network, users served by a single telecommunications service provider, users within a user's private group of friends or contacts, and/or users within an associated address book, such as a network address book (NAB). The network address book (NAB), which may reside within database 254 or separately from database 254, is configured to synchronize data stored on mobile devices 100, 210, 212, 214. The data may be from various social networking platforms, such as Facebook, MySpace, Twitter, and so on. In other words, the NAB stores contact information from a variety of different social networks for a mobile device, which may not include software specific to the social networks. The server 252 may transmit data from the NAB to the mobile device for storage and/or updating previously forwarded and locally stored data in the mobile device. The data forwarded from the NAB to the mobile device may be stored in a phonebook, contact list, or similar internal memory of the mobile device. Further details regarding the Network Address Book and associated systems and processed may be found in U.S. patent application Ser. No. 12/345,659, filed on Dec. 29, 2008, entitled SYSTEM AND METHOD FOR TELECOMMUNICATION WITH A WEB-BASED NETWORK, SUCH AS A SOCIAL NETWORK, which is incorporated by reference in its entirety.

Another example of a private, or restricted, group of users is a group created by a user via permissions. In some embodiments, a telecommunications provider's service plan allows users, or subscribers, to create contact groups containing a limited number of contacts or services. Communications to and/or from the contacts or services in the contact group are billed at a reduced rate (e.g., all communications are free, all communications are billed at a fixed monthly fee, all communications are billed at a reduced rate). The subscriber is allowed to periodically change the members of the contact group, with the service plan's billing scheme being applied to the new members in the contact group as soon as any change is made. Certain rules are applied to the composition of the contact group, including the allowed frequency of updates to the group, thereby constraining some of the modifications that the user can make to the group. Any modifications to the service plan proposed by the user are therefore verified by the service management system against a set of rules that characterize acceptable changes before being implemented. Further details may be found in U.S. patent application Ser. No. 11/400,925, filed on Apr. 10, 2006, entitled PREFERRED CONTACT GROUP CENTRIC INTERFACE, which is incorporated by reference in its entirety.

Figure 4B:
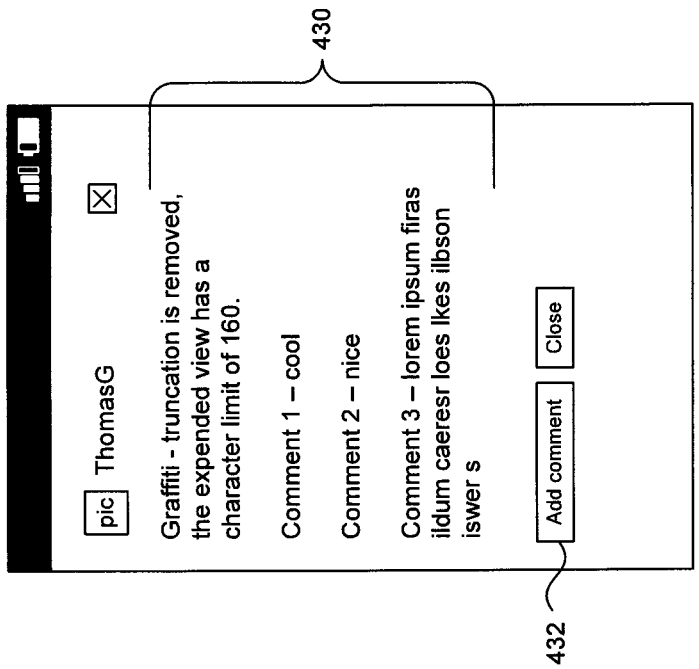
FIG. 4A to 4D are displays illustrating example mobile device screens used to facilitate entry of text between users via a map element.
Figure 4A:
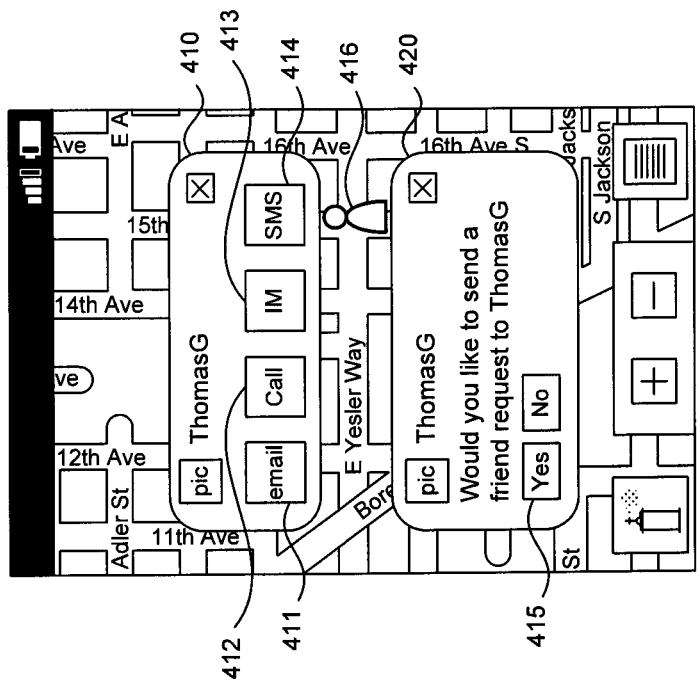
Figure 4D:
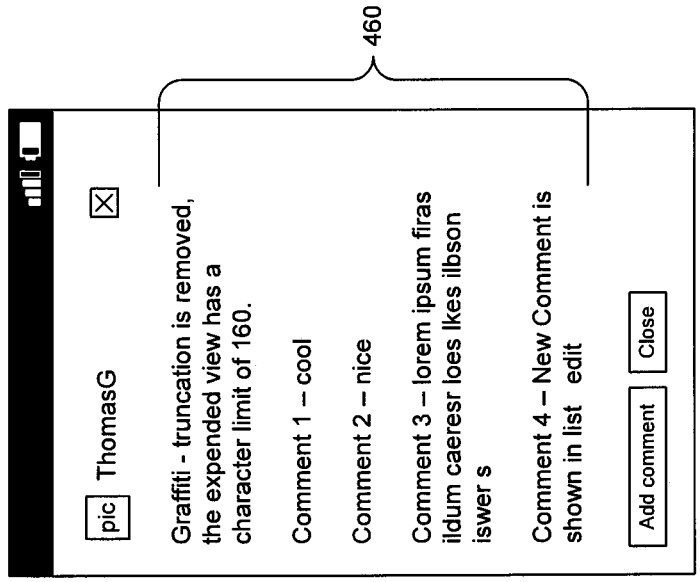
Figure 4C:
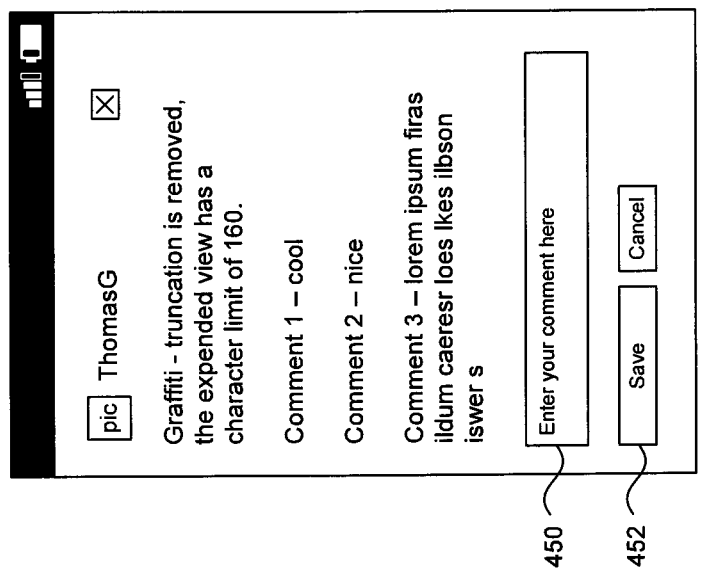

Referring to FIGS. 4A to 4D, example mobile device display screens used to facilitate communications between users via a map element are shown. FIG. 4A depicts user interfaces 410 and 420 that are presented in response to a user selection of a map element (in this case, an icon representing the location of first user/friend 416). Such elements/icons may include user-selectable icons, elements/icons chosen by the users to whom the elements/icons relate, dynamically created depending on type of relationship (e.g., friend, business colleague, etc.), randomly generated, etc. The user interface 410 is presented and includes selectable icons that initiate, for instance, email messaging 411, a voice call 412, instant messaging 413, text messaging 414. The user interface 420 may also be presented and include an option to, for example, send a friend request 415, and so on.

FIG. 4B depicts a presented user interface permitting a mobile device user to add "reply" comments to a map element. The screen may include previous comments 430 as well as an input element 432 that facilitates entry of additional comments. User selection of input element 432 may cause the system to display the user interface depicted in FIG. 4C, which includes a text input element 450 to receive text entry from the user. Once text is entered, the user may elect to save the text entry via input element 452, which may cause the system to update the information associated with the map element and display the user interface depicted in FIG. 4D, which includes all entered comments in a comment list 460. Of course, the system may incorporate other displays, screens, user interfaces and icons when receiving and presenting content to users via a map element.

Dynamically Modifying Map Elements Based on Events at a Mobile Device

Figure 5:
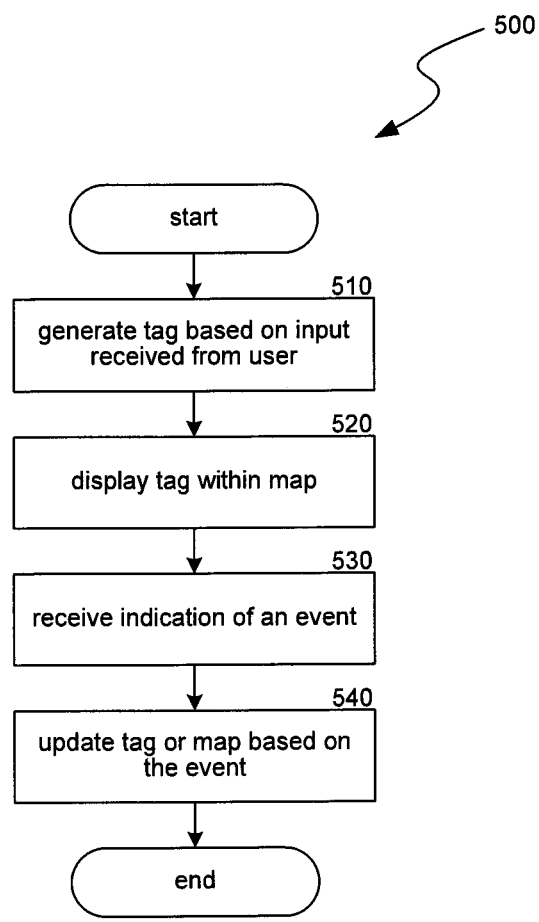
FIG. 5 is a flow diagram illustrating a routine for updating a map element within a mobile device.

As discussed herein, in some examples the system updates, modifies, alters, and/or changes displayed elements based on events that occur at or proximate to a mobile device and/or associated devices, or at a location associated with the element. Referring to FIG. 5, a flow diagram illustrating a routine 500 for updating a map element within a mobile device is shown.

In step 510, the system generates a map element based on input received from a user. For example, a user selects a map application, the mobile device launches a map application to display a map, and the user selects a location on the map via a touch screen. Alternatively, the user input may include a search query in a browser or other application that is relevant to locations. The map application may present one or more user-selectable icons to place at the location(s). The system generates one or more map elements, such as pin icons, based on the input identifying a location of a user's mobile device, a location input by the user or another location. For example, the system receives input from the user, transmits data to the server 252 identifying a location on the map that received the input, information identifying the mobile device and, optionally, the location of the mobile device. Alternatively, the system receives a search query for "bar" from the user and transmits data to the server 252. The server 252 identifies one or more drinking establishments within a general geographic region of the user, information relevant to the locations and, optionally, the location of other mobile devices at the relevant locations. The system may update a table with the information (such as Table 1 or 2).

In step 520, the system displays the map element(s) on a displayed map. For example, the system embeds the map element(s) to one or more locations selected by a user or otherwise relevant to the user input. That is, the system receives instructions from the server 252 to place one or more selected elements at location(s) selected by the user, relevant to user input, and to refresh the map application to display the updated map to the user.

In step 530, the system receives an indication of an event at the mobile device or at the location of the map element. For example, the system, via the network, may detect other users (such as friends) proximate to the location of the map element, may detect additional comments added to the map element, may detect the user moving closer to the map element, may detect the temporal position of a map element relative to other map elements, and so on. That is, the server 252 monitors locations of mobile devices within the network to determine when an event occurs, among other things. Upon determining an occurrence of an event, the server may then send information to a mobile device that causes the mobile device to perform an action based on the event. Further details regarding types of events are discussed herein.

In step 540, the system updates the map element (or, the displayed map) based on the event. For example, the system may change the color of the pin when the system detects that a user's friend(s)/contact(s) has arrived at the location, or may blink and/or issue an audible signal, when the user arrives at the pin's location. The system then displays the updated map element on the map, alerting the user that an event has occurred. That is, the system, upon receiving an indication of an occurrence of an event, transmits instructions to the mobile device to modify the element and to refresh the view of the element.

Figure 6C:
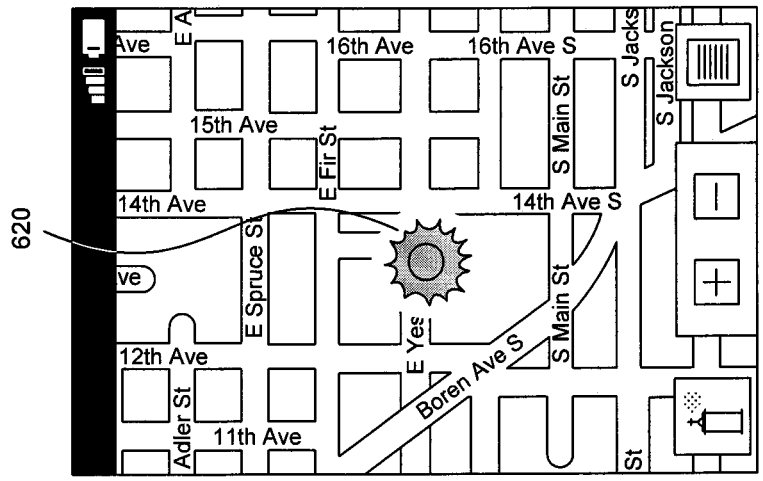
FIGS. 6A to 6C are displays illustrating example mobile device screens used to display dynamically changing map elements.
Figure 6B:
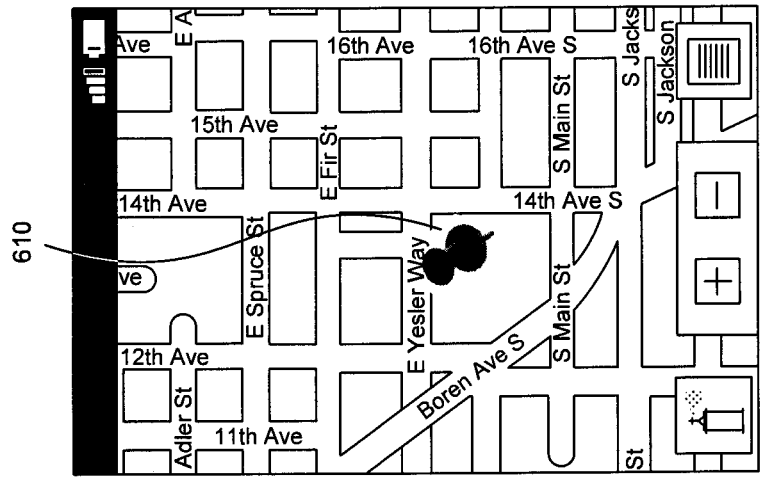
Figure 6A:
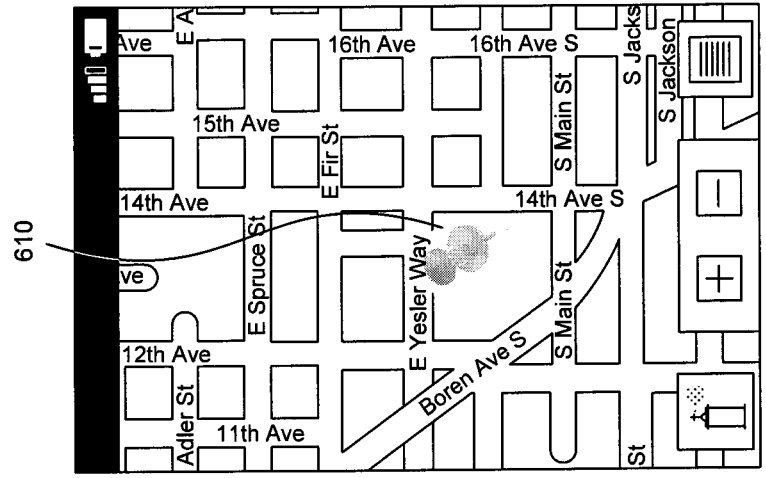

Thus, the system provides users with dynamic, active feedback and information via map elements placed on a map, and opposed to current systems that merely provide static information. Referring to FIGS. 6A to 6C, displays illustrating example mobile device screens used to display dynamically changing map elements are shown. FIG. 6A depicts a screen presenting a map element 610 before occurrence of an event. The map element may be a certain color, size, and/or design. After an event is detected, the system, in FIG. 6B, modifies the map element to indicate the occurrence of the event. For example, the system may change the color of the map element (as shown in the Figure) when a friend arrives at the location or adds a comment to the map element. The system may also modify the map element based on events that occur with the user's mobile device. FIG. 6C depicts a screen presenting a different map element 620, a sun, when the system detects the user's mobile device to be proximate or at the location of the map element.

The system may dynamically adjust or modify map elements in a number of ways. Some examples include but are not limited to:
- displaying a map element at a location (that is, displaying a hidden element),
- changing the color of a map element,
- enhancing the brightness of a map element,
- dimming the brightness of a map element (e.g., fading the map element),
- changing the map element to a different element, and/or playing a sound or other audible content, and so on.

The map elements may take on or represent any number of characteristics associated with content. The system may associate a contact or a group of contacts with certain characteristics (such as icons, colors, ring tones, message tones, pictures, and so on) and apply any or all of the characteristics to associated map elements. For example, a contact for a user's brother may have a picture, and any corresponding map elements that indicate the user's brother on a map may include the picture.

Additionally, an occurrence of an event may take a number of different forms. Some examples include:
- movement of another mobile device near, to, or proximate to a tagged location, such as movement to within a pre-selected range of a map element,
- movement of a user's mobile device near, to, or proximate to the user's tagged location,
- a certain frequency or amount of activity in a certain region, such as above a threshold value,
- a certain frequency or amount of activity within a certain time period,
- a certain frequency or amount of activity around a certain tagged item on a map,
- a certain lack of frequency or lack of activity after a time period has lapsed,
- movement of a threshold number of mobile devices near, to, or proximate to the user's tagged location, and/or
- when the time of placement of a map element exceeds a threshold time, and so on.

In some cases, the map elements are not displayed until an event occurs. These elements may be visible upon the occurrence of an event, such as movement to a location associated with a hidden map element. The event may cause the system to display the hidden map element to the user. The system may also alert a user who created the hidden map element of any activity at another user's mobile device. For example, when a user approaches a location tagged by his friend with a hidden map element, the user's mobile device displays the map element, and the friend receives an alert or indication that such an event has occurred.

Figure 7B:
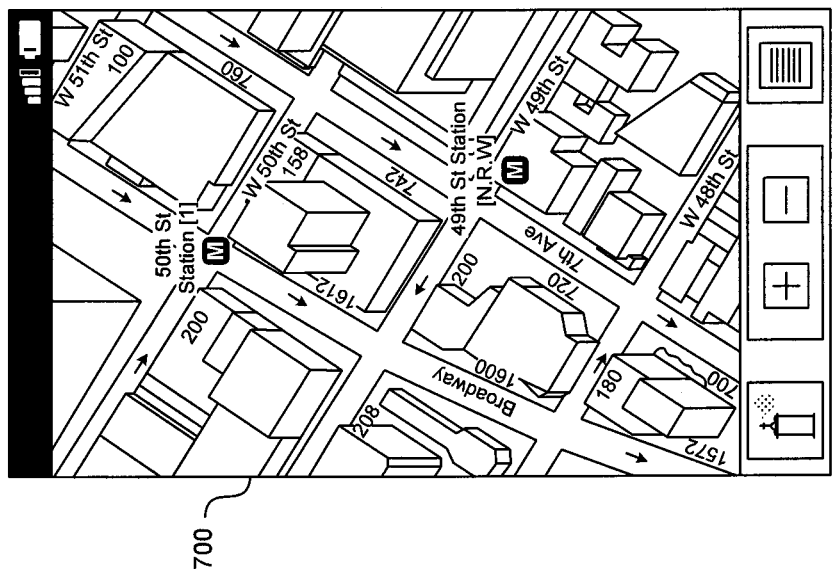
FIGS. 7A to 7B are displays illustrating example mobile device screens used to dynamically display information about elements on a map.
Figure 7A:
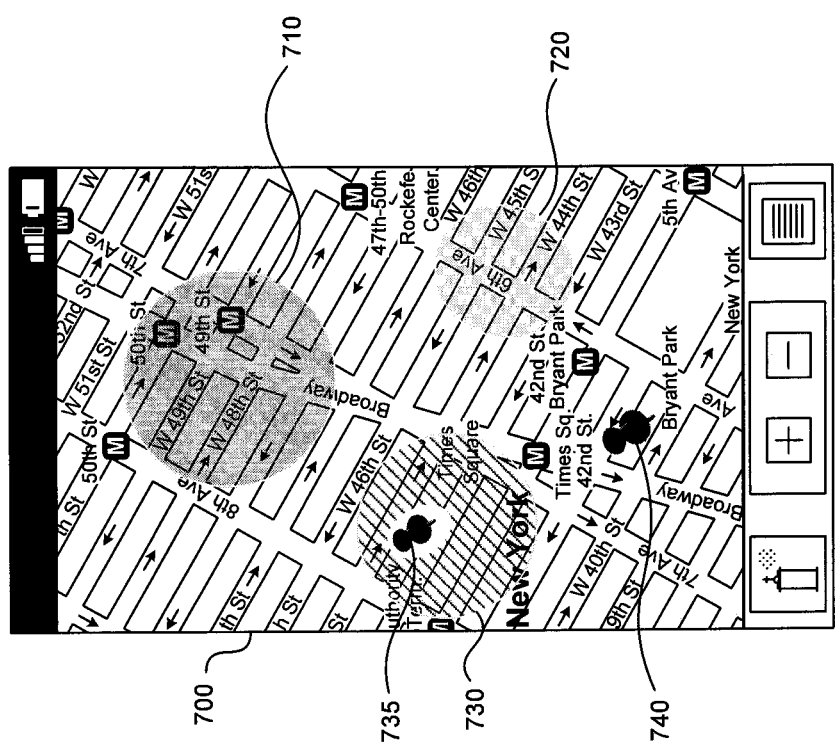

As discussed herein, in some examples the system presents or overlays a map or a displayed view of the map with various types of information based on the map elements within the map. FIGS. 7A to 7B are displays illustrating example mobile device screens used to dynamically display information about elements on a map. FIG. 7A depicts two highlighted zones 710, 720 on a map 700 displayed by a mobile device. These zones may be part of a "heat map" that shows a user increasing, decreasing, and/or static concentrations of elements on the map, concentrations of locations of other users, concentrations of comments provided by users at a location, and so on.

FIG. 7B depicts a more detailed or zoomed view of one of the zones 710 within the map 700. The detailed view shows each of the discrete map elements 720 that caused the system to display a hot zone 710 on the map 700. The system may present detailed views based on a number of inputs. Examples include direct input from a user (such as when a user taps a section of the map via a touch screen), indirect input from a user (such as when the system detects the user is at a certain location, or, alternatively, is not at a certain location and heading away from an intended location), and so on.

In providing specific zones on maps, the systems is able to provide users information that changes based on the user's and other user's interactions with a map. In some cases, the system facilitates selective presentation of the information. For example, the system may filter what information is shown based on user feedback and/or input. A user may wish to only view zones on a map that indicate a high concentration of a user's friends, or a high concentration of houses for rent, and so on. A user may also wish to only view zones on a map that indicate high concentrations of users who share demographic characteristics with the user.

In some cases, these zones may occur at tagged locations on the map. FIG. 7A also depicts a tagged location (indicated by icon 735) surrounded by a hot zone 730, as well as a tagged location (indicated by icon 740) that is not surrounded by a hot zone. The hot zone 730 around the icon 735 may indicate a certain amount or frequency of activity around or related to the location. For example, a certain number of contacts/friends or other mobile device users may have provided comments about the location, may be in proximity to the location, and so on. In contrast, the location associated with icon 740 may have received little such activity, and, hence, the map does not display a hot zone around the icon 740.

In some cases, the display of hot zones may change over time. For example, hot zone 730 may be a dark red when a threshold number of mobile device users are at the location or a certain number of comments are added about the location within a certain time period, and fade over time (for instance, decreasing the color saturation of the hot zone) as some mobile device users depart the location or if no new comments are provided for the location. Thus, the map may display map elements and/or zones on the map that dynamically change based on events, time, or a combination of events and time.

In some examples, the system may present a user interface that enables a user to modify the presentation of information (such as the types of zones shown). The user interface may facilitate the selection of filters or map elements to be displayed or not displayed, depending on user input. For example, a user may wish to restrict a view to only show users within his/her NAB, or to only show map elements placed within a certain time period.

In some examples, the system may present information without employing the map application based on the occurrence of events and/or the placement of map elements. For example, a mobile device 100 may receive location information from the server 252 for all friends in a user's address book, and sort a view of the address book based on the locations of the friends, such as from closest friend to farthest friend.

Example Scenarios

Scenario 1: A user selects a map element on his mobile device. The map element was placed on the map by a friend of the user. The map element includes an input selection element to initiate types of communication with the friend. After receiving a selection of one of the input elements corresponding to instant messaging (such as a IM icon) the system initiates an instant messaging session between the user and his friend.

Scenario 2: A user places a map element at a location on her mobile device's map for a bar she is planning on going to later the same night. The map element, a pin, is initially colored red. One of the user's friends arrives at the bar, and the mobile device, via an associated network, detects the user's friend is proximate to or at the location associated with the pin, the bar. The system updates the color of the pin to green, which indicates to the user that a friend has arrived at the location.

Scenario 3: A user searches for a T-Mobile store via a map application provided by her mobile device. The map application displays a map and places a map element on a displayed map corresponding to the store's location. The user attempts to walk to the store. As the user approaches the store, the system causes the map element to change colors, indicating to the user that the user is heading in the correct direction. Once the user reaches a certain distance, the system may also expand the view of the map, providing the user with a more detailed view of the map based on her location in relation to the store.

Scenario 4: The system receives information from other applications running on a user's mobile device or on a network associated with the mobile device. For example, the system reviews all Twitter messages ("tweets") sent and received by a user and his friends. The system then identifies locations of content (such as stores, restaurants, and so on) discussed within the tweets, and updates a user's map with map elements that indicate the content and corresponding locations.

Of course, one skilled in the art will realize that other scenarios are possible.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the system is not intended to be exhaustive or to limit the system to the precise form disclosed above. While specific examples for the system are described above for illustrative purposes, various equivalent modifications are possible within the scope of the system, as those skilled in the relevant art will recognize. For example, while aspects of the system are described above with respect to capturing and routing digital images, any other digital content may likewise be managed or handled by the system provided herein, including video files, audio files, and so forth. While processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

The teachings of the system provided herein can be applied to other systems, not necessarily the system described above. The elements and acts of the various examples described above can be combined to provide further implementations of the system.

Other changes can be made to the system in light of the above Detailed Description. While the above description describes certain examples of the system, and describes the best mode contemplated, no matter how detailed the above appears in text, the system can be practiced in many ways. Details of the system may vary considerably in its specific implementation, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly defines such terms. Accordingly, the actual scope of the system encompasses not only the disclosed examples, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

We claim:

1. A system for displaying information on a map via a display screen of a mobile device, the system comprising:
a mobile device including a map application, wherein the map application is configured to:
display a map, a zone of color over a portion of the map, and one or more user selectable map elements via a screen of the mobile device based on instructions received from a server,
wherein the zone of color is indicative of a concentration of people within a geographic region who are associated with a user of the mobile device;
wherein at least one of the one or more user selectable map elements is associated with two or more people, and
wherein the mobile device has access to contact information for the two or more people;

display a communication interface featuring a communication option via a screen of the mobile device permitting the user to select the communication option upon user selection of the at least one map element associated with each of the two or more people; and initiate a communication with each of the two or more people based upon user selection of the communication option, wherein the communication with the two or more people is initiated upon user selection of the communication option, and using the contact information for the two or more people; and a server accessible via a telecommunications network, wherein the server includes:

a location determination component, wherein the location determination component is configured to identify a location for the mobile device;

a mapping component, wherein the mapping component is configured to associate the location for the mobile device with the map, the zone of color over the portion of the map, and the one or more map elements; and a communication component, wherein the communication component is configured to send instructions to present the map and the one or more map elements placed on the presented maps to the mobile device.

2. The system of claim 1, wherein the communication option includes one of: a voice call option, a video call option, an e-mail option, an SMS message option, a MMS message option, an instant message option, a reply to a posting option, or a friend request option.

3. The system of claim 1, wherein the user selection of the map element includes touching an icon representing the map element on a touch sensitive display of the mobile device.

4. The system of claim 1, wherein the server further includes:

an event detection component, wherein the event detection component is configured to detect an occurrence of an event associated with an element and instruct the mapping component to provide instructions to the mobile device based on the event.

5. The system of claim 4, wherein the occurrence of an event includes movement of the mobile device from a first location to a second location proximate to a map element.

6. The system of claim 1, wherein the server is further configured to receive data from the mobile device.

7. The system of claim 6, where the received data includes location data.

8. The system of claim 1, wherein the server includes two or more associated servers.

9. The system of claim 1, wherein the contact information for the two or more people is stored in a network address book of the user.

10. The system of claim 1, wherein at least one of the one or more user selectable map elements includes a picture associated with at least one of the two or more people.

11. A method for providing communications between users of mobile devices, the method comprising:

receiving input, at a network server, from a map application running on a first mobile device and located within a network containing the network server, wherein the received input includes:

input identifying a desired location of a map element to be placed on a map displayed by the map application; and input identifying content to be provided with the map element;

generating, at the network server, a map element based on the received input;

transmitting instructions to a second mobile device and a third mobile device to cause a map application running on each of the second mobile device and third mobile device to display a map and the map element;

receiving input, at the network server, from one of the first mobile device and the second mobile device, wherein the input is received at the displayed map element on the map and includes content to be added to the map element;

transmitting instructions to the third mobile device and whichever of the first mobile device and second mobile device the network server did not receive the input from to cause the map applications running on the third mobile device and whichever of the first mobile device and second mobile device the network server did not receive the input from to display the map element, wherein displaying the map element includes displaying the content received from the one of the first mobile device and the second mobile device, wherein at least one of the map application running on the first mobile device, the map application running on the second mobile device, and the map application running on the third mobile device displays the map element within a zone of color over a portion of the map, and wherein the zone of color is indicative of a concentration of people within a geographic region who are associated with a user of the first mobile device when the zone of color is displayed on the first mobile device, the zone of color is indicative of a concentration of people within a geographic region who are associated with a user of the second mobile device when the zone of color is displayed on the second mobile device, and the zone of color is indicative of a concentration of people within a geographic region who are associated with a user of the third mobile device when the zone of color is displayed on the third mobile device.

12. The method of claim 11, wherein generating the map element includes:

generating an icon associated with the location on the map; and generating a text balloon associated with the icon that receives the content to be added to the map element and presents the content to the first, second, and third mobile devices.

13. A method for providing communications between users of mobile devices, the method comprising:

receiving, at a server associated with a first mobile device, user input selecting a location and map element to be placed at the selected location from the first mobile device;

transmitting instructions to cause a second mobile device and a third mobile device to generate and display a map element on a map presented by the second mobile device and a map presented by the third mobile device, respectively, along with an icon associated with a synchronous communication session between the first mobile device, the second mobile device, and the third mobile device, wherein a zone of color is displayed over a portion of the map presented by the second mobile device, wherein the zone of color is indicative of a concentration of people within a geographic region who are associated with a user of the second mobile device; and upon receiving, at the server, an indication of a selection of the icon from the second mobile device or third mobile device, initiating a synchronous communication session associated with the icon, wherein the communication session is between the first mobile device, the second mobile device, and the third mobile device.

14. The method of claim 13, wherein the icon is associated with communications using one of an instant messaging application, a voice conference application, a video conference application, or a text messaging application.

15. The method of claim 13, wherein information associated with the first mobile device, information associated with the second mobile device, and information associated with the third mobile device are stored with a network address book stored at the server.

16. The method of claim 13, wherein information associated with the first mobile device and information associated with the third mobile device is stored in a contact list associated with the second mobile device.

17. A method for displaying a map element on a display screen of a first mobile device, the method comprising:
    displaying a map via a screen on a first mobile device associated with a telecommunications network;
    displaying a map element at a location on the displayed map; and
    modifying the displayed map element based on an occurrence of an event at a second mobile device associated with the telecommunications network,
        wherein a selection of the map element may initiate a communication session among the first mobile device, the second mobile device, and a third mobile device,
        wherein a user of the third mobile device and a user of the first mobile device have a connection with one another,
        wherein the user of the second mobile device and the user of the first mobile device have a connection with one another, and
        wherein the first mobile device has access, via a network address book, to contact information associated with the second mobile device and the third mobile device.

18. The method of claim 17, wherein modifying the displayed map element includes changing a color of the map element when one of the second mobile device or the third mobile device arrives at a location associated with the displayed map element.

19. The method of claim 17, wherein modifying the displayed map element includes changing an icon associated with the map element when two or more mobile devices arrive at a location associated with the displayed map element.

20. The method of claim 17, wherein modifying the displayed map element includes changing content displayed by the map element when input is received at the second mobile device or third mobile device via a display of the map element at the first mobile device.

21. The method of claim 17, wherein modifying the displayed map element includes displaying a zone of color over a portion of the map based on a number of map elements within the portion of the map.

22. The method of claim 17, wherein modifying the displayed map element includes displaying a detailed view of a portion of a map based on input received at the first mobile device.

23. The method of claim 17, wherein modifying the displayed map element includes displaying a detailed view of a portion of a map based on a detected location of the first mobile device with respect to the map element.

24. The method of claim 17, wherein an occurrence of an event at the second mobile device includes a detection of a location of the second mobile device.

25. The method of claim 17, wherein an occurrence of an event at the second mobile device includes a detection of input associated with one of the map elements received at the second mobile device.

26. A system for displaying a map element to a user via a display screen of a mobile device, the system comprising:
    means for receiving input from a first user via a map application running on a first mobile device associated with the first user, wherein the received input includes:
        input identifying a desired location of a map element to be placed on a map displayed by the map application; and
        input identifying content to be provided with the map element;
    means for generating a map element based on the received input;
    means for displaying the map element to a second user on a map via a map application running on a second mobile device associated with the second user;
    means for displaying the map element to a third user on a map via a map application running on a third mobile device associated with the third user;
    means for receiving input at the displayed map element on the map via the map application running on the second mobile device; wherein the received input includes content to be added to the map element; and
    means for displaying the map element to the first user on the map via the map application running on the first mobile device and to the third user on the map via the map application running on the third mobile device;
        wherein displaying the map element includes displaying the content received from the first mobile device along with the content received from the second mobile device,
        wherein a zone of color is displayed over a portion of the map, and
        wherein the zone of color is indicative of a concentration of people within a geographic region who are associated with the first user.

27. A system for displaying information on a map via a display screen of a mobile device, the system comprising:
    three or more mobile devices located within a user-selected, private group of mobile devices within a telecommunications network, wherein the three or more mobile devices each include a map application, wherein the map application is configured to:
        display a map via a screen within the mobile devices;
        display map elements at locations on the displayed maps;
        modify the displayed elements based on instructions received from a server located within the telecommunications network;
        receive a selection of a map element; and
        initiate, upon the selection of the map element, a communication session among at least three of the three or more members of the private group of mobile devices; and
    a content server located within the telecommunications network, wherein the content server includes:
        a mapping component, wherein the mapping component is configured to provide instructions to the three or more mobile devices located within the telecommunications network to cause the three or more mobile devices to present maps and one or more map elements placed on the presented maps;

a location determination component, wherein the location determination component is configured to identify a location for the two-three or more mobile devices located within the telecommunications network;

a communication component, wherein the communication component is configured to receive and send information among the three or more members of the private group of mobile devices located within the telecommunications network; and an event detection component, wherein the event detection component is configured to detect an occurrence of an event associated with one of the three or more mobile devices and instruct the mapping component to provide instructions to the other mobile devices of the private group based on the event.

28. The system of claim 27, wherein the event detection component is configured to detect movement of one of the one or more mobile devices from a first location to a second location proximate to a map element displayed on one of the one or more mobile devices.

29. The system of claim 27, wherein the event detection component is configured to detect input provided to a map element located on a map displayed by the one or more mobile devices.

30. The system of claim 27, wherein the event detection component is configured to detect a temporal position of a map element in relation to other map elements located on a map displayed by the one or more mobile devices.

* * * * *